United States Patent
Komatsu et al.

(10) Patent No.: US 12,194,983 B2
(45) Date of Patent: Jan. 14, 2025

(54) HYBRID ELECTRIC VEHICLE PROPULSION START CONTROL

(71) Applicant: TOYOTA JIDOSHA KABUSHIKI KAISHA, Aichi-ken (JP)

(72) Inventors: Takehiro Komatsu, Toyota (JP); Masahiro Kachi, Nagakute (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 220 days.

(21) Appl. No.: 18/071,630

(22) Filed: Nov. 30, 2022

(65) Prior Publication Data

US 2023/0227022 A1 Jul. 20, 2023

(30) Foreign Application Priority Data

Jan. 14, 2022 (JP) ................................ 2022-004728

(51) Int. Cl.
*B60W 20/40* (2016.01)
*B60W 10/02* (2006.01)

(52) U.S. Cl.
CPC ............ *B60W 20/40* (2013.01); *B60W 10/02* (2013.01); *B60W 2510/0638* (2013.01); *B60W 2510/0676* (2013.01); *B60W 2710/06* (2013.01)

(58) Field of Classification Search
CPC ................. B60W 20/40; B60W 10/02; B60W 2510/0638; B60W 2510/0676; B60W 2710/06
See application file for complete search history.

(56) References Cited

U.S. PATENT DOCUMENTS

| | | | |
|---|---|---|---|
| 2014/0221156 A1* | 8/2014 | Sugimura | B60W 10/02 477/83 |
| 2016/0031438 A1* | 2/2016 | Matsui | B60L 50/16 180/65.23 |
| 2016/0200316 A1* | 7/2016 | Orita | B60W 20/40 180/65.265 |
| 2018/0009433 A1* | 1/2018 | Johri | F02D 41/065 |
| 2018/0162214 A1* | 6/2018 | Yoshida | B60K 6/485 |
| 2018/0162378 A1* | 6/2018 | Kim | B60K 6/442 |

(Continued)

FOREIGN PATENT DOCUMENTS

| | | |
|---|---|---|
| JP | H10-212983 A | 8/1998 |
| JP | 2001-227380 A | 8/2001 |
| JP | 2010-223007 A | 10/2010 |

(Continued)

OTHER PUBLICATIONS

Machine translation of JP-2017154585-A (Year: 2017).*
Machine translation of KR 102212790 B1 (Year: 2021).*

*Primary Examiner* — Hussein Elchanti
*Assistant Examiner* — Kenneth M Dunne
(74) *Attorney, Agent, or Firm* — HAUPTMAN HAM, LLP (57) ABSTRACT

In start control for controlling an engine, a motor, and a clutch, a target throttle valve opening degree is set based on a rotational speed of the motor and a coolant temperature of the engine to control the engine such that the clutch is half-engaged to crank the engine by the motor, and fuel injection and ignition of the engine are started after a rotational speed difference between the rotational speed of the motor and a rotational speed of the engine becomes smaller than a threshold value and the clutch is engaged.

3 Claims, 4 Drawing Sheets

(56) References Cited

U.S. PATENT DOCUMENTS

2022/0009479 A1\* 1/2022 Sukegawa ............. B60W 20/20
2023/0119802 A1\* 4/2023 Park ..................... B60W 20/19
    701/22

FOREIGN PATENT DOCUMENTS

| JP | 2015-164831 A | | 9/2015 |
| JP | 2017154585 A | \* | 9/2017 |
| JP | 2020111276 A | | 7/2020 |
| KR | 102212790 B1 | \* | 2/2021 |

\* cited by examiner

HYBRID ELECTRIC VEHICLE PROPULSION START CONTROL

CROSS-REFERENCE TO RELATED APPLICATION

This application claims priority to Japanese Patent Application No. 2022-004728 filed on Jan. 14, 2022, incorporated herein by reference in its entirety.

BACKGROUND

1. Technical Field

The present disclosure relates to a hybrid electric vehicle, and more particularly, to a hybrid electric vehicle including an engine, a motor connected to an output shaft of the engine via a clutch, and an automatic transmission device connected to a rotation shaft of the motor and drive wheels.

2. Description of Related Art

Conventionally, as a hybrid electric vehicle of this type, there has been proposed a hybrid electric vehicle including an engine, a motor connected to an output shaft of the engine via a clutch, and an automatic transmission device connected to a rotation shaft of the motor and an axle (for example, see Japanese Unexamined Patent Application Publication No. 2020-111276 (JP 2020-111276 A)). In this hybrid electric vehicle, when the vehicle is caused to travel by the motor with the clutch released, the engine is started while controlling the clutch toward engagement.

SUMMARY

In such a hybrid electric vehicle, the clutch may be half-engaged to crank the engine by the motor, and after the rotational speed difference between the rotational speed of the motor and the rotational speed of the engine becomes small enough and the clutch is engaged, fuel injection and ignition of the engine may be started to start the engine. In this case, in order to suppress the torque shock transmitted to the drive wheels, it is preferable to suppress an increase in the initial combustion torque.

The main objective of the hybrid electric vehicle of the present disclosure is to suppress an increase in the initial combustion torque of the engine.

The hybrid electric vehicle of the present disclosure adopts the following means in order to achieve the main objective described above.

The hybrid electric vehicle of the present disclosure is a hybrid electric vehicle including: an engine; a motor connected to an output shaft of the engine via a clutch; an automatic transmission device connected to a rotation shaft of the motor and drive wheels; and a control device. In start control for controlling the engine, the motor, and the clutch, the control device sets a target throttle valve opening degree based on a rotational speed of the motor and a coolant temperature of the engine to control the engine such that the clutch is half-engaged to crank the engine by the motor, and fuel injection and ignition of the engine are started after a rotational speed difference between the rotational speed of the motor and a rotational speed of the engine becomes smaller than a threshold value and the clutch is engaged.

In the hybrid electric vehicle of the present disclosure, in start control for controlling an engine, a motor, and a clutch, a target throttle valve opening degree is set based on a rotational speed of the motor and a coolant temperature of the engine to control the engine such that the clutch is half-engaged to crank the engine by the motor, and fuel injection and ignition of the engine are started after a rotational speed difference between the rotational speed of the motor and a rotational speed of the engine becomes smaller than a threshold value and the clutch is engaged. The time required to engage the clutch after starting the start control varies depending on the rotational speed of the motor and the coolant temperature of the engine. In addition, the state of the decrease in the in-cylinder air amount after starting the start control varies depending on the throttle valve opening degree. Therefore, by setting the target throttle valve opening degree in consideration of the rotational speed of the motor and the coolant temperature of the engine, after engaging the clutch, the air amount in the cylinder can be such that the initial combustion torque becomes sufficiently small (around value zero). Accordingly, by starting the fuel injection and the ignition after engaging the clutch, it is possible to suppress an increase in the initial combustion torque. As a result, it is possible to suppress the torque shock transmitted to the drive wheels.

In the hybrid electric vehicle of the present disclosure, in the start control, the control device may set the target throttle valve opening degree using a map determined in advance such that the higher the rotational speed of the motor, the larger the target throttle valve opening degree, and the lower the coolant temperature of the engine, the larger the target throttle valve opening degree. With the above configuration, the target throttle valve opening degree can be set more appropriately.

In the hybrid electric vehicle of the present disclosure, the control device may set the target throttle valve opening degree based on the rotational speed of the motor and the coolant temperature of the engine in the start control during traveling, and control the motor such that the motor rotates at a predetermined rotational speed and set the target throttle valve opening degree based on the coolant temperature of the engine in the start control while the hybrid electric vehicle is stopped. With the above configuration, it is possible to set the target throttle valve opening degree depending on whether to perform the start control during traveling or the start control while the hybrid electric vehicle is stopped.

In this case, in the start control while the hybrid electric vehicle is stopped, the control device may set the target throttle valve opening degree using a map determined in advance such that the target throttle valve opening degree is larger than the target throttle valve opening degree in the start control during traveling when the rotational speed of the motor and the coolant temperature of the engine are the same. This is because, unlike the case of the start control during traveling, there is no travel request in the start control while the hybrid electric vehicle is stopped, and it is not required to start the engine quickly.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, modes for carrying out the disclosure will be described using an embodiment.

Figure 1:
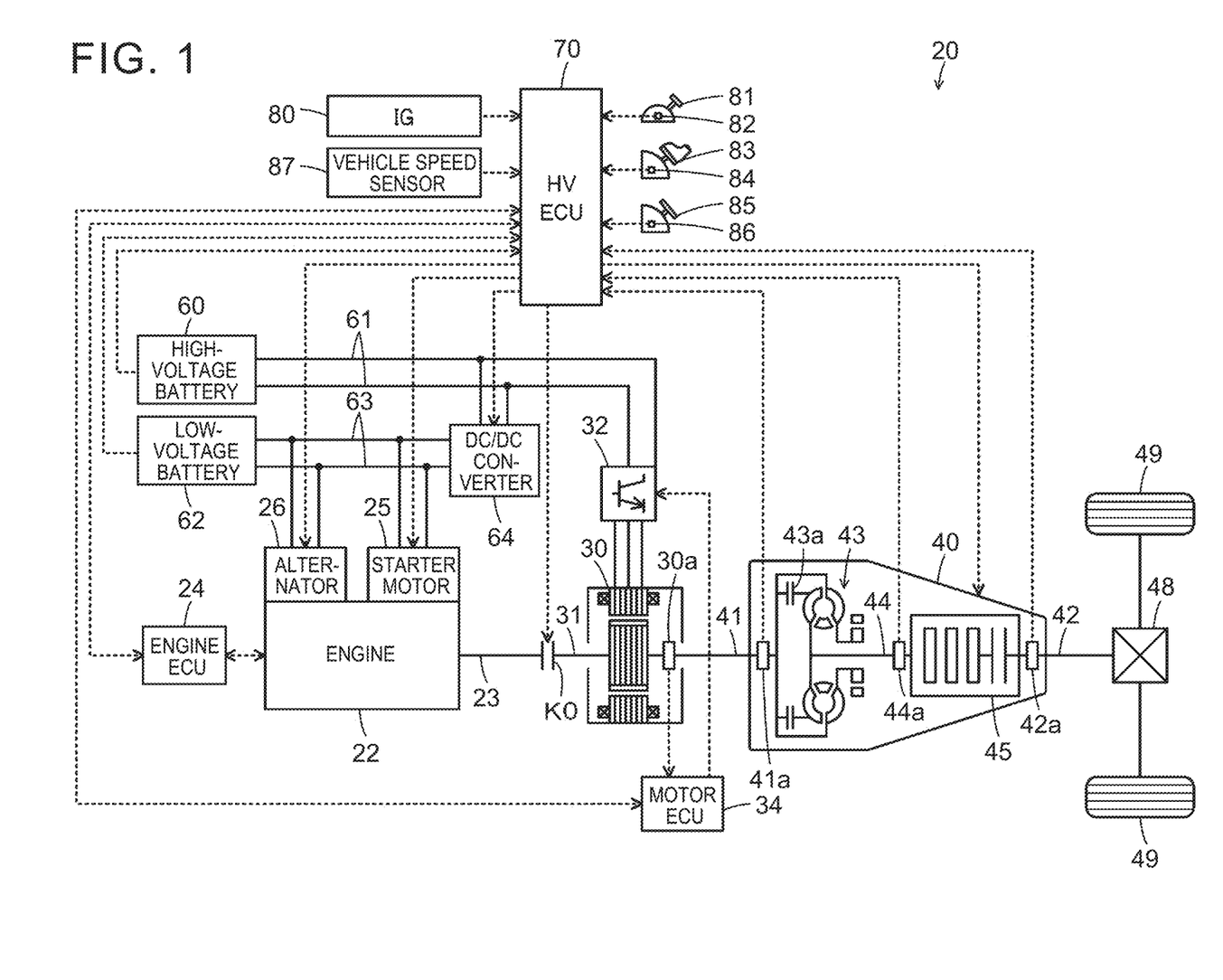
FIG. 1 is a configuration diagram showing a schematic configuration of a hybrid electric vehicle 20 as an embodiment of the present disclosure.
Figure 2:
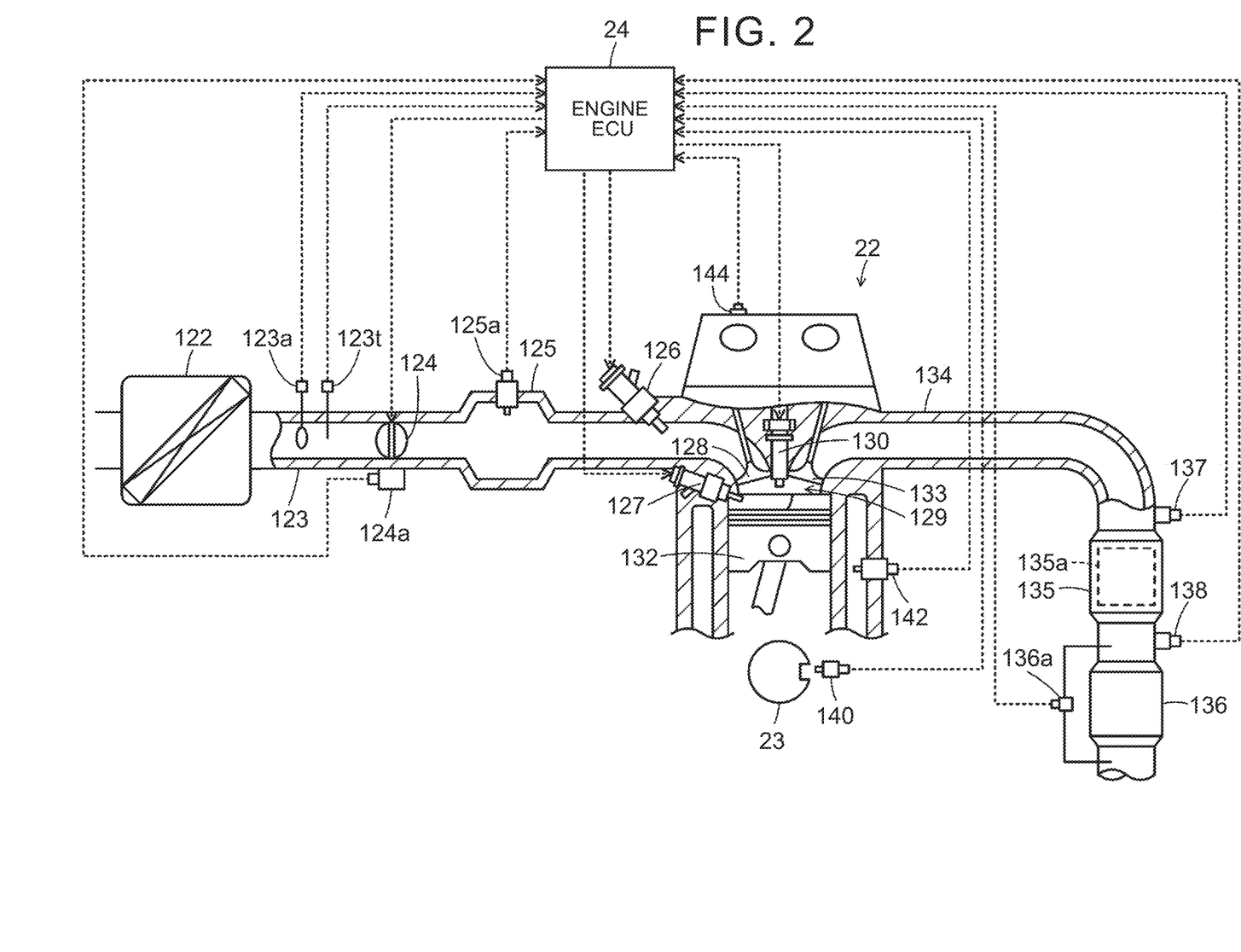
FIG. 2 is a schematic diagram showing a configuration of an engine 22 mounted on the hybrid electric vehicle 20.

FIG. 1 is a configuration diagram showing a schematic configuration of a hybrid electric vehicle 20 as an embodiment of the present disclosure. FIG. 2 is a schematic diagram showing a configuration of an engine 22 mounted on the hybrid electric vehicle 20. The hybrid electric vehicle 20 of the embodiment includes the engine 22, a motor 30, an inverter 32, a clutch K0, an automatic transmission device 40, a high-voltage battery 60, a low-voltage battery 62, a direct current-to-direct current (DC/DC) converter 64, and a hybrid electronic control unit (hereinafter referred to as "HV ECU") 70, as shown in FIG. 1.

The engine 22 is configured as a six-cylinder internal combustion engine that uses fuel such as gasoline or diesel oil to output power by four strokes of intake, compression, expansion (combustion), and exhaust. As shown in FIG. 2, the engine 22 includes a port injection valve 126 for injecting fuel into an intake port, and an in-cylinder injection valve 127 for injecting fuel into the cylinder. The engine 22 has the port injection valve 126 and the in-cylinder injection valve 127, so that the engine 22 can be operated in either a port injection mode, an in-cylinder injection mode, or a common injection mode. In the port injection mode, air cleaned by an air cleaner 122 is taken into an intake pipe 123 to pass through a throttle valve 124 and a surge tank 125, and fuel is injected from the port injection valve 126 downstream of the surge tank 125 of the intake pipe 123 to mix air and fuel. Then, the air-fuel mixture is taken into a combustion chamber 129 through an intake valve 128, and is combusted by an electric spark by a spark plug 130 to convert the reciprocating motion of a piston 132 pushed down by the energy in the cylinder bore into the rotational motion of a crankshaft 23. In the in-cylinder injection mode, as in the port injection mode, air is taken into the combustion chamber 129, fuel is injected from the in-cylinder injection valve 127 in the intake stroke and the compression stroke, and the air-fuel mixture is combusted by an electric spark by the spark plug 130 to obtain a rotational motion of the crankshaft 23. In the common injection mode, when air is taken into the combustion chamber 129, fuel is injected from the port injection valve 126, and also fuel is injected from the in-cylinder injection valve 127 in the intake stroke or the compression stroke, whereby the air-fuel mixture is combusted by an electric spark by the spark plug 130 to obtain a rotational motion of the crankshaft 23. These injection modes are switched based on the operating state of the engine 22. Exhaust gas discharged from the combustion chamber 129 to an exhaust pipe 134 via an exhaust valve 133 is discharged to the outside air via an exhaust control device 135 and a particulate matter (PM) filter 136. The exhaust control device 135 has an exhaust reduction catalyst (three-way catalyst) 135a for reducing harmful components of carbon monoxide (CO), hydrocarbons (HC), and nitrogen oxides (NOx) in the exhaust gas. The PM filter 136 is formed as a porous filter made of material such as ceramics or stainless steel, to collect particulate matter such as soot in the exhaust gas Instead of the PM filter 136, a four-way catalyst obtained by combining the reduction function of the three-way catalyst and the collecting function for the particulate matter may be used.

The engine 22 is operated and controlled by an engine electronic control unit (ECU) 24. Although not shown, the engine ECU 24 includes a microcomputer having a central processing unit (CPU), a read-only memory (ROM), a random access memory (RAM), a flash memory, an input/output port, and a communication port. Signals from various sensors necessary for controlling the operation of the engine 22 are input to the engine ECU 24 via an input port. Examples of the signals input to the engine ECU 24 may include a crank angle θcr from a crank position sensor 140 for detecting the rotational position of the crankshaft 23 of the engine 22, and a coolant temperature Tw from a coolant temperature sensor 142 for detecting the temperature of the coolant of the engine 22. Examples of the signals input to the engine ECU 24 may also include cam angles θci, θco from a cam position sensor 144 for detecting the rotational position of an intake camshaft that opens and closes the intake valve 128 and the rotational position of an exhaust camshaft that opens and closes the exhaust valve 133. Examples of the signals input to the engine ECU 24 may also include a throttle valve opening degree TH from a throttle valve position sensor 124a for detecting the position of the throttle valve 124, an intake air amount Qa from an air flow meter 123a mounted upstream of the throttle valve 124 of the intake pipe 123, an intake air temperature Ta from a temperature sensor 123t mounted upstream of the throttle valve 124 of the intake pipe 123, and a surge pressure Ps from a pressure sensor 125a mounted on the surge tank 125. Examples of the signals input to the engine ECU 24 may also include a front air-fuel ratio AF1 from a front air-fuel ratio sensor 137 mounted upstream of the exhaust control device 135 of the exhaust pipe 134, a rear air-fuel ratio AF2 from a rear air-fuel ratio sensor 138 mounted between the exhaust control device 135 and the PM filter 136 of the exhaust pipe 134, a differential pressure ΔP from a differential pressure sensor 136a for detecting the differential pressure before and after passing through the PM filter 136 (differential pressure between the upstream side and the downstream side of the PM filter 136).

Various control signals for controlling the operation of the engine 22 are output from the engine ECU 24 via an output port. Examples of the signals output from the engine ECU 24 may include a control signal to the throttle valve 124, a control signal to the port injection valve 126, a control signal to the in-cylinder injection valve 127, and a control signal to the spark plug 130.

The engine ECU 24 is connected to the HV ECU 70 via a communication port. The engine ECU 24 calculates the rotational speed Ne of the engine 22 based on the crank angle θcr of the engine 22 from the crank position sensor 140. The engine ECU 24 also calculates the load factor (ratio of the volume of air actually taken in at one cycle to the stroke volume per cycle of the engine 22) KL based on the intake air amount Qa from the air flow meter 123a and the rotational speed Ne of the engine 22. Further, the engine ECU 24 estimates the in-cylinder air amount Qcy using an air model based on the throttle valve opening degree TH from the throttle valve position sensor 124a, the intake air temperature Ta from the temperature sensor 123t, and the like. In addition, the engine ECU 24 calculates the PM deposited amount Qpm as the deposited amount of particulate matter deposited on the PM filter 136, based on the differential pressure ΔP from the differential pressure sensor 136a, or calculates the filter temperature tf as the temperature of the PM filter 136 based on the rotational speed Ne of the engine 22 and the load factor KL.

As shown in FIG. 1, a starter motor 25 for cranking the engine 22 and an alternator 26 for generating electric power using power from the engine 22 are connected to the crankshaft 23 of the engine 22. The starter motor 25 and the alternator 26 are connected to low-voltage side power lines 63 along with the low-voltage battery 62 and are controlled by the HV ECU 70.

The motor 30 is configured as a synchronous generator motor, and has a rotor in which a permanent magnet is embedded in a rotor core, and a stator in which a three-phase coil is wound around a stator core. A rotation shaft 31 to which the rotor of the motor 30 is fixed is connected to the crankshaft 23 of the engine 22 via the clutch K0 and is connected to an input shaft 41 of an automatic transmission 45. The inverter 32 is used to drive the motor 30 and is connected to high-voltage side power lines 61. The motor 30 is rotationally driven when a motor electronic control unit (hereinafter referred to as "motor ECU") 34 performs switching control on a plurality of switching elements of the inverter 32.

Although not shown, the motor ECU 34 includes a microcomputer having a CPU, a ROM, a RAM, a flash memory, an input/output port, and a communication port. Signals from various sensors are input to the motor ECU 34 via an input port. Examples of the signals input to the motor ECU 34 may include a rotational position θmg from a rotational position sensor 30a for detecting the rotational position of the rotor (rotation shaft 31) of the motor 30, and a phase current Iu, Iv from the current sensor for detecting the phase current of each phase of the motor 30. Control signals to the inverter 32 and the like are output from the motor ECU 34 via an output port. The motor ECU 34 is connected to the HV ECU 70 via a communication port. The motor ECU 34 calculates the rotational speed Nmg of the motor 30 based on the rotational position θmg of the rotor (rotation shaft 31) of the motor 30 from the rotational position sensor 30a.

The clutch K0 is configured, for example, as a hydraulic driven friction clutch and is controlled by the HV ECU 70 to connect and disconnect the crankshaft 23 of the engine 22 to and from the rotation shaft 31 of the motor 30.

The automatic transmission device 40 includes a torque converter 43 and, for example, an automatic transmission 45 having six gears. The torque converter 43 is configured as a general fluid transmission device, and transmits the power from the input shaft 41 connected to the rotation shaft 31 of the motor 30 to a transmission input shaft 44 that is an input shaft of the automatic transmission 45 by amplifying the torque, or transmits the power as it is without amplifying the torque. The automatic transmission 45 includes the transmission input shaft 44, an output shaft 42 connected to drive wheels 49 via a differential gear 48, a plurality of planetary gears, and a plurality of hydraulic driven frictional engagement elements (clutches, brakes). Each of the frictional engagement elements has a hydraulic servo comprising a piston, a plurality of frictional engagement plates (friction plates and separator plates), an oil chamber to which hydraulic fluid is supplied, and the like. The automatic transmission 45 establishes a forward gear or a rearward gear from first gear to sixth gear by engaging and disengaging the frictional engagement elements, and thereby transmits power between the transmission input shaft 44 and the output shaft 42. Hydraulic pressure of hydraulic oil from a mechanical oil pump or an electric oil pump is regulated and supplied to the clutch K0 or the automatic transmission 45 by a hydraulic control device (not shown). The hydraulic control device includes a valve body provided with a plurality of oil passages, a plurality of regulator valves, a plurality of linear solenoid valves, and the like. The hydraulic control device is controlled by the HV ECU 70.

The high-voltage battery 60 is configured as, for example, a lithium ion secondary battery or a nickel hydrogen secondary battery having a rated voltage of about several hundred V, and is connected to the high-voltage side power lines 61 together with the inverter 32. The low-voltage battery 62 is configured as, for example, a lead storage battery having a rated voltage of about 12 V or 14 V, and is connected to the low-voltage side power lines 63 together with the starter motor 25 and the alternator 26. The DC/DC converter 64 is connected to the high-voltage side power lines 61 and the low-voltage side power lines 63. The DC/DC converter 64 supplies electric power from the high-voltage side power lines 61 to the low-voltage side power lines 63 with a voltage step-down.

Although not shown, the HV ECU 70 includes a microcomputer having a CPU, a ROM, a RAM, a flash memory, an input/output port, and a communication port. Signals from various sensors are input to the HV ECU 70 via an input port. Examples of the signals input to the HV ECU 70 may include a rotational speed Nin from a rotational speed sensor 41a attached to the input shaft 41 of the automatic transmission device 40, a rotational speed Nmi from a rotational speed sensor 44a attached to the transmission input shaft 44 of the automatic transmission device 40, and a rotational speed Nout from a rotational speed sensor 42a attached to the output shaft 42 of the automatic transmission device 40. Examples of the signals input to the HV ECU 70 may also include a voltage Vbh of the high-voltage battery 60 from a voltage sensor attached between terminals of the high-voltage battery 60, a current Ibh of the high-voltage battery 60 from a current sensor attached to an output terminal of the high-voltage battery 60, and a voltage Vbl from a voltage sensor attached between terminals of the low-voltage battery 62. Examples of the signals input to the HV ECU 70 may also include an ignition signal from an ignition switch 80, a shift position SP from a shift position sensor 82 fix detecting the operation position of a shift lever 81, an accelerator operation amount Acc from an accelerator pedal position sensor 84 for detecting the depression amount of an accelerator pedal 83, a brake pedal position BP from a brake pedal position sensor 86 for detecting the depression amount of a brake pedal 85, and a vehicle speed V from a vehicle speed sensor 87.

Various control signals are output from the HV ECU 70 via an output port. Examples of the signals output from the HV ECU 70 may include a control signal to the starter motor 25 and a control signal to the alternator 26. Examples of the signals output from the HV ECU 70 may also include a control signal to the clutch K0 and the automatic transmission device 40 (hydraulic control device), and a control signal to the DC/DC converter 64. The HV ECU 70 is connected to the engine ECU 24 and the motor ECU 34 via a communication port. The HV ECU 70 calculates a rotational speed ratio Gt of the automatic transmission device 40 by dividing the rotational speed Nin of the input shaft 41 of the automatic transmission device 40 from the rotational speed sensor 41a by the rotational speed rout of the output shaft 42 of the automatic transmission device 40 from the rotational speed sensor 42a. The HV ECU 70 calculates the storage rate SOCh of the high-voltage battery 60 based on the current Ibh of the high-voltage battery 60 from the current sensor.

In the embodiment, the engine 22, the clutch K0, the motor 30, the HV ECU 70, the engine ECU 24, and the motor ECU 34 correspond to the engine device.

In the hybrid electric vehicle 20 of the embodiment configured as described above, the engine 22, the clutch K0, the motor 30, and the automatic transmission device 40 are controlled so that the hybrid electric vehicle 20 travels in a hybrid traveling mode (HV traveling mode) or an electric traveling mode (EV traveling mode) by cooperative control between the HV ECU 70, the engine ECU 24, and the motor ECU 34. Here, the HV traveling mode is a mode in which the clutch K0 is engaged and traveling is performed using the power of the engine 22, and the EV traveling mode is a mode in which the clutch K0 is released and traveling is performed without using the power of the engine 22.

In the control of the automatic transmission device 40 in the HV traveling mode or the EV traveling mode, the HV ECU 70 first sets a target gear M* of the automatic transmission 45 based on the accelerator operation amount Acc and the vehicle speed V. When the gear M of the automatic transmission 45 matches the target gear M*, the automatic transmission 45 is controlled so that the gear M is maintained. In contrast, when the gear M differs from the target gear M*, the automatic transmission 45 is controlled so that the gear M matches the target gear M*.

In the control of the engine 22 and the motor 30 in the HV traveling mode, the HV ECU 70 first sets the required torque Tout* required for traveling (required for the output shaft 42 of the automatic transmission device 40) based on the accelerator operation amount Acc and the vehicle speed V. Subsequently, a value obtained by dividing the required torque Tout* of the output shaft 42 by the rotational speed ratio Gt of the automatic transmission device 40 is set to the required torque Tin* of the input shaft 41. When the required torque Tin* of the input shaft 41 is set in this way, the target torque Te* of the engine 22 and the torque command Tm* of the motor 30 are set so that the required torque Tin* is output to the input shaft 41, and the target torque Te* of the engine 22 is transmitted to the engine ECU 24 and the torque command Tm* of the motor 30 is transmitted to the motor ECU 34. Upon receiving the target torque Te*, the engine ECU 24 performs operation control (such as intake air amount control, fuel injection control, and ignition control) of the engine 22 so that the engine 22 is operated at the target torque Te*. Upon receiving the torque command Tm*, the motor ECU 34 performs switching control of a plurality of switching elements of the inverter 32 so that the motor 30 is driven by the torque command Tm*.

In the control of the motor 30 in the EV traveling mode, the HV ECU 70 sets the required torque Tin* of the input shaft 41 as in the HV traveling mode, sets the torque command Tm* of the motor 30 so that the required torque Tin* is output to the input shaft 41, and transmits the torque command Tm* to the motor ECU 34. Upon receiving the torque command Tm*, the motor ECU 34 performs switching control of a plurality of switching elements of the inverter 32 so that the motor 30 is driven by the torque command Tm*.

Further, in the hybrid electric vehicle 20 of the embodiment, when a stop request of the engine 22 is made when the engine 22 is being operated by cooperative control between the HV ECU 70, the engine ECU 24, and the motor ECU 34, the fuel injection and the ignition of the engine 22 are intermittently stopped and the clutch K0 is released. The stop request of the engine 22 is made, for example, when the condition that the storage rate SOCh of the high-voltage battery 60 is equal to or larger than a threshold value Srefh and the required torque Tin* of the input shaft 41 is smaller than a threshold value Tinref is satisfied. When a start request of the engine 22 is made when the fuel injection and the ignition of the engine 22 are intermittently stopped, start control of the engine 22 is executed. The start request of the engine 22 is made, for example, when at least one of the condition that the storage rate SOCh of the high-voltage battery 60 is smaller than the threshold value Srefh, and the condition that the required torque Tin* is equal to or larger than the threshold value Tinref is satisfied while the fuel injection and the ignition of the engine 22 are intermittently stopped.

In the start control of the engine 22, for example, the clutch K0 is half-engaged (slip engaged) to crank the engine 22 using the cranking torque from the motor 30, and when the rotational speed difference ΔN between the rotational speed Nmg of the motor 30 and the rotational speed Ne of the engine 22 becomes smaller than a threshold value ΔNref (e.g., about 50 rpm to 150 rpm), the clutch K0 is engaged and then the fuel injection and the ignition of the engine 22 are started. When the start control of the engine 22 is performed while the vehicle is stopped, since it is not necessary to output the torque for traveling from the motor 30, in the embodiment, the motor 30 is controlled so as to rotate at a relatively low predetermined rotational speed Nmg1.

Figure 3:
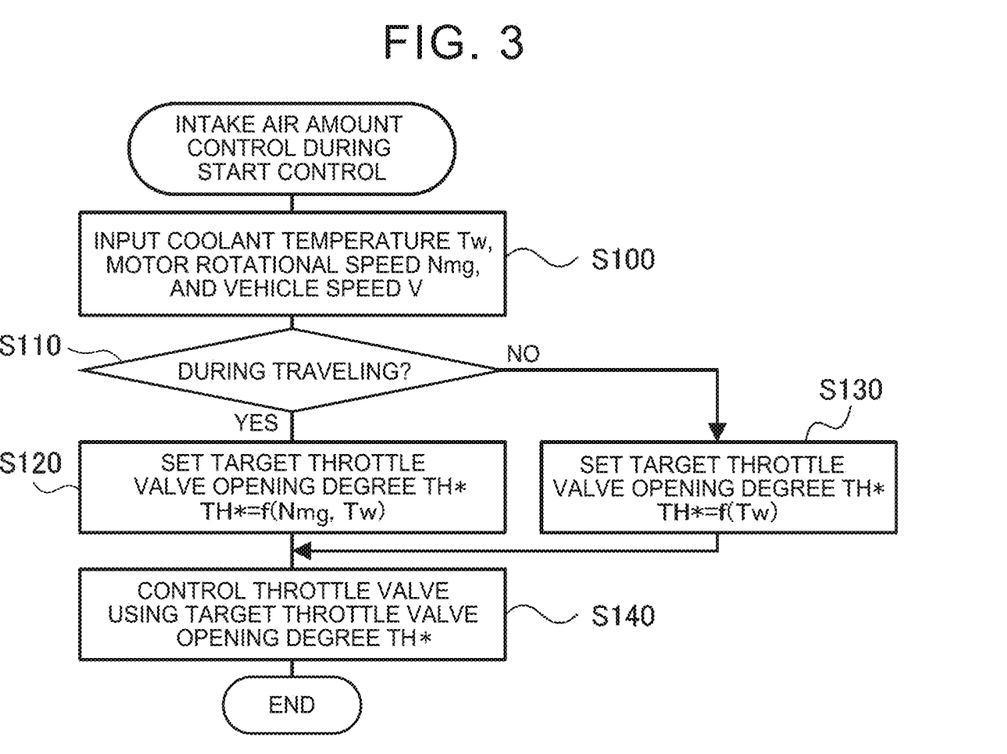
FIG. 3 is a flowchart showing an example of intake air amount control during start control executed by an engine electronic control unit (ECU) 24.

Next, the operation of the hybrid electric vehicle 20 of the embodiment, in particular, the intake air amount control during the start control described above will be described. FIG. 3 is a flowchart showing an example of the intake air amount control during the start control executed by the engine ECU 24. This process is executed at the time of the start control during traveling or when the vehicle is stopped.

In the intake air amount control during the start control in FIG. 3, the engine ECU 24 first inputs data such as the coolant temperature Tw of the engine 22, the rotational speed Nmg of the motor 30, and the vehicle speed V (step S100). Here, as the coolant temperature Tw of the engine 22, the value detected by the coolant temperature sensor 142 is input. As the rotational speed Nmg of the motor 30, the value calculated by the motor ECU 34 based on the rotational position θmg of the rotor of the motor 30 is input by communication via the HV ECU 70. As the vehicle speed V, the value detected by the vehicle speed sensor 87 is input by communication from the HV ECU 70.

When the data is input in this way, it is determined whether the vehicle is traveling or stopped using the vehicle speed V (step S110). When it is determined that the vehicle is traveling, a target throttle valve opening degree TH* that is the target opening degree of the throttle valve 124 is set based on the rotational speed Nmg of the motor 30 and the coolant temperature Tw of the engine 22 (step S120), the throttle valve 124 is controlled using the set target throttle valve opening degree TH* (step S140), and the process ends.

Figure 4:
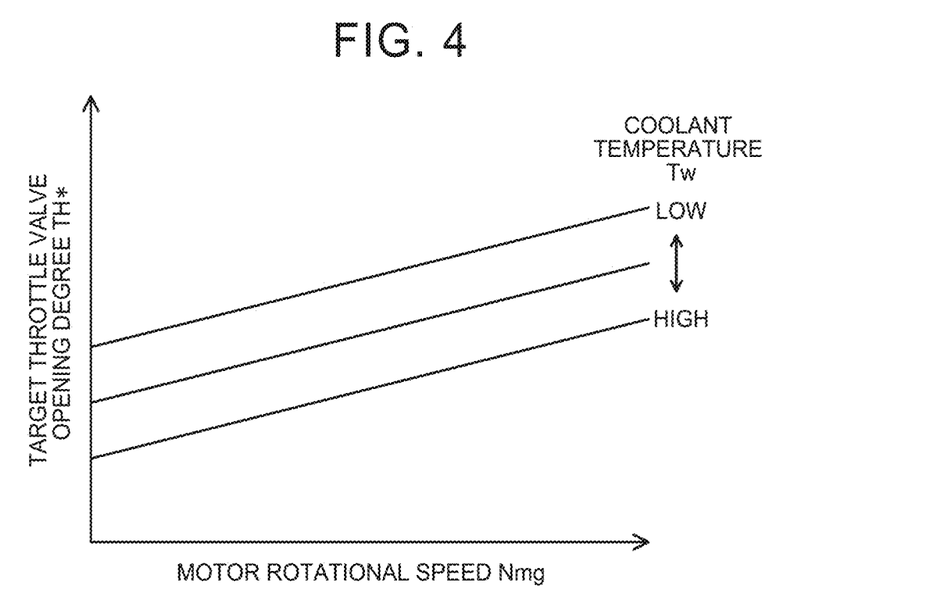
FIG. 4 is an explanatory diagram showing an example of a first map.

In this case, the target throttle valve opening degree TH* can be set by, for example, storing the relationship between the rotational speed Nmg of the motor 30, the coolant temperature Tw of the engine 22, and the target throttle valve opening degree TH* as a first map determined in advance by experiments, analysis, machine learning, etc., and deriving the corresponding target throttle valve opening degree TH* from this map when the rotational speed Nmg of the motor 30 and the coolant temperature Tw of the engine 22 are given. FIG. 4 is an explanatory diagram showing an example of the first map. As shown in FIG. 4, the target throttle valve opening degree TH* in this case is set so as to be larger as the rotational speed Nmg of the motor 30 is higher, and is set so as to be larger as the coolant temperature Tw of the engine 22 is lower. Basically, the larger the throttle valve opening degree TH of the throttle valve 124, the decrease in the in-cylinder air amount Qcy during the start control becomes slower. The relationship between the rotational speed Nmg of the motor 30 and the target throttle valve opening degree TH* is based on the fact that the higher the rotational speed Nmg of the motor 30, the longer the time required to engage the clutch K0 (hereinafter referred to as "engagement time") after the rotational speed difference ΔN becomes smaller than the threshold value ΔNref from the start of the start control. The relationship between the coolant temperature Tw of the engine 22 and the target throttle valve opening degree TH* is based on the fact that the lower the coolant temperature Tw, the larger the friction of the engine 22 and the less likely the rotational speed Ne of the engine 22 increases, and the fact that the lower the coolant temperature Tw, the less stable the combustion in the engine 22. In the embodiment, in consideration of the rotational speed Nmg of the motor 30 and the coolant temperature Tw of the engine 22, the target throttle valve opening degree TH* is set so that the in-cylinder air amount Qcy becomes a substantially zero torque air amount Qcy1 in a relatively short time after engaging the clutch K0. The substantially zero torque air amount Qcy1 is determined in advance by experiment, analysis, machine learning, etc. as the air amount for which the initial combustion torque becomes substantially value zero. After engaging the clutch K0, by starting the fuel injection and the ignition in the cylinder in which the in-cylinder air amount Qcy is close to the substantially zero torque air amount Qcy1, it is possible to suppress an increase in the initial combustion torque. The fuel injection amount and the ignition timing at this time are set so that the initial combustion torque is approximately zero.

When it is determined in step S110 that the vehicle is stopped, the target throttle valve opening degree TH* is set based on the coolant temperature Tw of the engine 22 (step S130), the throttle valve 124 is controlled using the set target throttle valve opening degree TH* (step S140), and the process ends. At this time, the motor 30 is controlled to rotate at the predetermined rotational speed Nmg1 described above.

Figure 5:
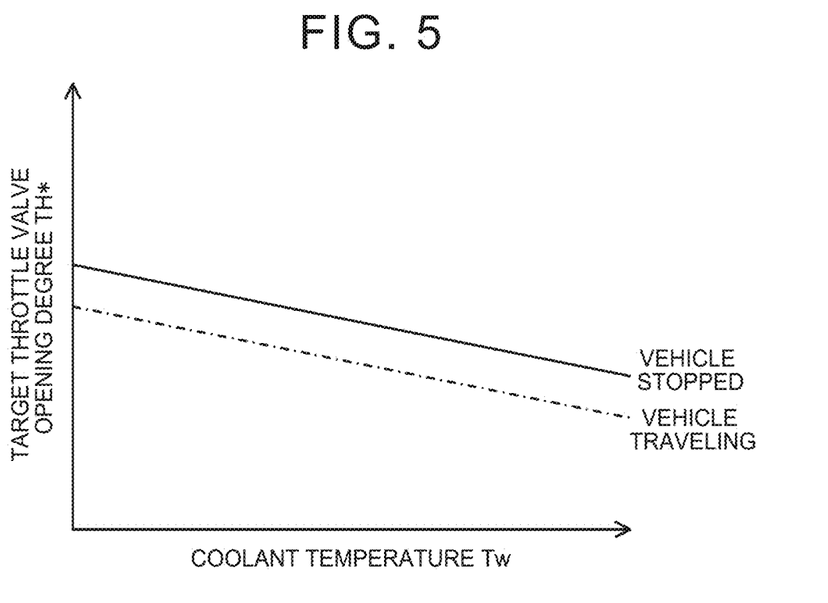
FIG. 5 is an explanatory diagram showing an example of a second map.

In this case, the target throttle valve opening degree TH* can be set by, for example, storing the relationship between the coolant temperature Tw of the engine 22 and the target throttle valve opening degree TH* as a second map determined in advance by experiments, analysis, machine learning, etc., and deriving the corresponding target throttle valve opening degree TH* from this map when the coolant temperature Tw of the engine 22 is given. FIG. 5 is an explanatory diagram showing an example of the second map. In FIG. 5, for reference, the relationship between the coolant temperature Tw of the engine 22 and the target throttle valve opening degree TH* when the rotational speed Nmg of the motor 30 at the time of the start control during traveling is the predetermined rotational speed Nmg1 described above (hereinafter referred to as "at the predetermined rotational speed during traveling") is illustrated by a long dashed short dashed line. As shown in FIG. 5, the target throttle valve opening degree TH* in this case is set to be larger as the coolant temperature Tw of the engine 22 is lower, and is set to be larger than that at the predetermined rotational speed during traveling. The relationship between the coolant temperature Tw of the engine 22 and the target throttle valve opening degree TH* is based on the same reason as in the first map of FIG. 4. The relationship between whether the vehicle is stopped or traveling and the target throttle valve opening degree TH* is basically based on the fact that, in the start control while the vehicle is stopped, unlike the start control while the vehicle is traveling, there is no travel request and the engine 22 is not required to be started quickly. In the embodiment, in the start control while the vehicle is stopped, by increasing the target throttle valve opening degree TH* as compared to the start control at the predetermined rotational speed during traveling to slow the decrease in the in-cylinder air amount Qcy, the target throttle valve opening degree TH* is set so that the in-cylinder air amount Qcy becomes the substantially zero torque air amount Qcy1 after a certain amount of time has elapsed after engaging the clutch K0 (after a longer time than the case of the start control at the predetermined rotational speed during traveling). After engaging the clutch K0, by starting the fuel injection and the ignition in the cylinder in which the in-cylinder air amount Qcy is close to the substantially zero torque air amount Qcy1, it is possible to suppress an increase in the initial combustion torque.

Figure 6:
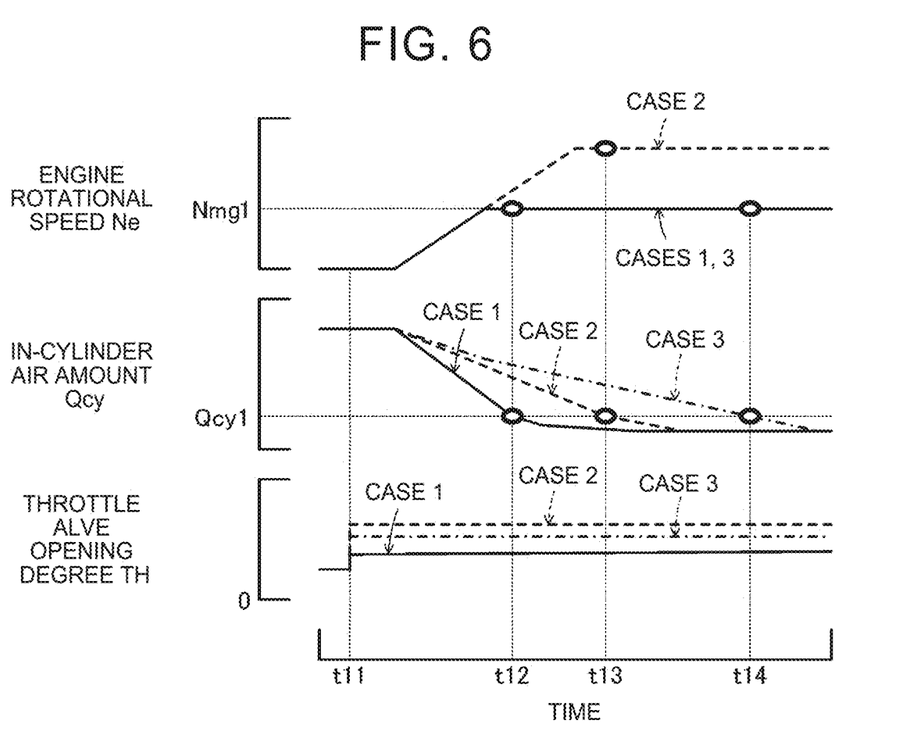
FIG. 6 is a time chart showing an example of a rotational speed Ne of the engine 22, an in-cylinder air amount Qcy, and a throttle valve opening degree TH when a coolant temperature Tw is at a certain temperature during the start control.

FIG. 6 is a time chart showing an example of the rotational speed Ne of the engine 22, the in-cylinder air amount Qcy, and the throttle valve opening degree TH when the coolant temperature Tw is at a certain temperature during the start control. In FIG. 6, the solid line shows the state when the rotational speed Nmg of the motor 30 is the predetermined rotational speed Nmg1 during traveling (case 1), the broken line shows the state when the rotational speed Nmg of the motor 30 is somewhat higher than the predetermined rotational speed Nmg1 during traveling (case 2), and the long dashed short dashed line shows the state when the rotational speed Nmg of the motor 30 is the predetermined rotational speed Nmg1 while the vehicle is stopped (case 3). Further, in FIG. 6, the black circle mark shows the timing of the initial combustion in cases 1, 2, and 3.

In case 1, when the start request is made (time t11), the start control is started, the throttle valve opening degree TH is set to the opening degree based on the rotational speed Nmg of the motor 30 and the coolant temperature Tw of the engine 22, and the clutch K0 is half-engaged to crank the engine 22 using the cranking torque from the motor 30. Then, after the rotational speed difference ΔN between the rotational speed Nmg of the motor 30 and the rotational speed Ne of the engine 22 becomes smaller than the threshold value ΔNref and the clutch K0 is engaged, the first fuel injection and ignition are performed in the cylinder in which the in-cylinder air amount Qcy is close to the substantially zero torque air amount Qcy1 to cause the initial combustion (time t12).

In case 2 and case 3, the control of the clutch K0 and the motor 30 and the control of the throttle valve 124 of the engine 22 during the start control are performed in the same manner as in case 1, except that the throttle valve opening degree TH is different. In case 2, as compared with case 1, the rotational speed Nmg of the motor 30 is high, and since the time until the engagement of the clutch K0 is longer, the throttle valve opening degree TH is increased to slow the decrease in the in-cylinder air amount Qcy. In case 3, as compared with case 1, since it is not required to start the engine 22 quickly, the throttle valve opening degree TH is increased to slow the decrease in the in-cylinder air amount Qc. In case 2 and case 3, after engaging the clutch K0, the first fuel injection and ignition are performed in the cylinder in which the in-cylinder air amount Qcy is close to the substantially zero torque air amount Qcy1 to cause the initial combustion (time t13 and time t14). By performing such control in cases 1, 2, and 3, it is possible to suppress an increase in the initial combustion torque. As a result, it is possible to suppress a torque shock transmitted to the drive wheels 49.

In the hybrid electric vehicle 20 of the embodiment described above, when the start request of the engine 22 is made, the clutch K0 is half-engaged to crank the engine 22 by the motor 30, and after the rotational speed difference ΔN between the rotational speed Nmg of the motor 30 and the rotational speed Ne of the engine 22 becomes smaller than the threshold value ΔNref and the clutch K0 is engaged, the start control for starting the fuel injection and the ignition of the engine 22 is executed. During this start control, the engine 22 is controlled by setting the target throttle valve opening degree TH* so that the higher the rotational speed Nmg of the motor 30, the larger the target throttle valve opening degree TH*, and the lower the coolant temperature Tw of the engine 22, the larger the target throttle valve opening degree TH*. Thus, the in-cylinder air amount Qcy can become the substantially zero torque air amount Qcy1 after engaging the clutch K0. Accordingly, by starting the fuel injection and the ignition after engaging the clutch K0, it is possible to suppress an increase in the initial combustion torque. As a result, it is possible to suppress the torque shock transmitted to the drive wheels 49.

In the hybrid electric vehicle 20 of the embodiment, in the start control during traveling, the target throttle valve opening degree TH* is set using the first map (see FIG. 4), and in the start control while the vehicle is stopped, the target throttle valve opening degree TH* is set using the second map (see FIG. 5). However, even in the start control while the vehicle is stopped, as in the start control during traveling, the target throttle valve opening degree TH* may be set using the first map.

The hybrid electric vehicle 20 of the embodiment is provided with the automatic transmission 45 having six gears. However, the hybrid electric vehicle 20 may be provided with an automatic transmission having four gears, five gears, eight gears, or the like.

The hybrid electric vehicle 20 of the embodiment is provided with the engine ECU 24, the motor ECU 34, and the HV ECU 70. However, at least two of these may be configured integrally.

The correspondence between the main elements of the embodiment and the main elements of the disclosure described in the SUMMARY will be described. In the embodiment, the engine 22 corresponds to the "engine", the clutch K0 corresponds to the "clutch", the motor 30 corresponds to the "motor", the automatic transmission device 40 corresponds to the "automatic transmission device", and the HV ECU 70, the engine ECU 24, and the motor ECU 34 correspond to the "control device".

As for the correspondence between the main elements of the embodiment and the main elements of the disclosure described in the SUMMARY, since the embodiment is an example for specifically describing a mode for carrying out the disclosure described in the SUMMARY, the embodiment does not limit the elements of the disclosure described in the SUMMARY. In other words, the interpretation of the disclosure described in the SUMMARY should be performed based on the description in the SUMMARY, and the embodiment is merely a specific example of the disclosure described in the SUMMARY.

Although the modes for carrying out the disclosure have been described above with the embodiment, the disclosure is not limited to the embodiment, and may be embodied in various modes without departing from the scope of the disclosure.

The present disclosure is applicable to the manufacturing industry of a hybrid electric vehicle and the like.

What is claimed is:

1. A hybrid electric vehicle, comprising:
   an engine;
   a motor connected to an output shaft of the engine via a clutch;
   an automatic transmission device connected to a rotation shaft of the motor and drive wheels; and
   a control device, wherein
   in start control for controlling the engine, the motor, and the clutch,
      the control device sets a target throttle valve opening degree based on a rotational speed of the motor and a coolant temperature of the engine to control the engine such that the clutch is half-engaged to crank the engine by the motor, and fuel injection and ignition of the engine are started after a rotational speed difference between the rotational speed of the motor and a rotational speed of the engine becomes smaller than a threshold value and the clutch is engaged, and
   the control device
      sets the target throttle valve opening degree based on the rotational speed of the motor and the coolant temperature of the engine in the start control during traveling, and
      controls the motor such that the motor rotates at a predetermined rotational speed and sets the target throttle valve opening degree based on the coolant temperature of the engine in the start control while the hybrid electric vehicle is stopped.

2. The hybrid electric vehicle according to claim 1, wherein
   in the start control during traveling, the control device sets the target throttle valve opening degree using a map determined in advance such that the higher the rotational speed of the motor, the larger the target throttle valve opening degree, and the lower the coolant temperature of the engine, the larger the target throttle valve opening degree.

3. The hybrid electric vehicle according to claim 1, wherein
   in the start control while the hybrid electric vehicle is stopped, the control device sets the target throttle valve opening degree using a map determined in advance such that the target throttle valve opening degree is larger than the target throttle valve opening degree in the start control during traveling when the rotational speed of the motor and the coolant temperature of the engine are the same.

* * * * *